United States Patent

Dakin et al.

[11] 4,228,326
[45] Oct. 14, 1980

[54] SYSTEM FOR RECORDING INFORMATION ON A ROTATABLE STORAGE DISC, IN A SUBSTANTIALLY UNIFORM RECORDING DENSITY

[75] Inventors: Wayne R. Dakin, Redondo Beach; Ludwig Ceshkovsky, Fountain Valley, both of Calif.

[73] Assignee: MCA Discovision Inc., Universal City, Calif.

[21] Appl. No.: 961,405

[22] Filed: Nov. 16, 1978

[51] Int. Cl.² .............................................. G11B 19/24
[52] U.S. Cl. ...................... 179/100.1 G; 179/100.1 S
[58] Field of Search ......................... 358/128; 360/73; 179/100.4 C, 100.4 D, 100.4 E, 100.3 V, 100.1 S, 100.1 G; 365/215; 346/76 L, 137, 108

[56] References Cited

U.S. PATENT DOCUMENTS

| | | | |
|---|---|---|---|
| 2,113,226 | 4/1938 | Young | 179/100.4 C |
| 2,901,737 | 8/1959 | Stovall, Jr. | 360/73 |
| 3,646,259 | 2/1972 | Schuller | 360/73 |
| 3,939,302 | 2/1976 | Kihara | 179/100.3 V |
| 4,123,779 | 10/1978 | Goldschmidt | 358/128 |

FOREIGN PATENT DOCUMENTS 2257817  5/1974  Fed. Rep. of Germany .... 179/100.1 S

*Primary Examiner*—James W. Moffitt
*Assistant Examiner*—Donald McElheny, Jr.
*Attorney, Agent, or Firm*—Ronald J. Clark

[57] ABSTRACT

Method and apparatus for controllably rotating an information storage disc relative to a radially movable optical transducer, whereby information is recorded on the disc in a series of substantially circular and concentrically arranged information tracks. The angular velocity of the disc and the radial velocity of the transducer are controllably adjusted to be inversely proportional to the radius of the particular information track being recorded, whereby the track is moved at a constant linear velocity relative to the transducer and the successive tracks are equally spaced with respect to each other, and whereby a uniform information recording density over the surface of the disc is achieved.

8 Claims, 3 Drawing Figures

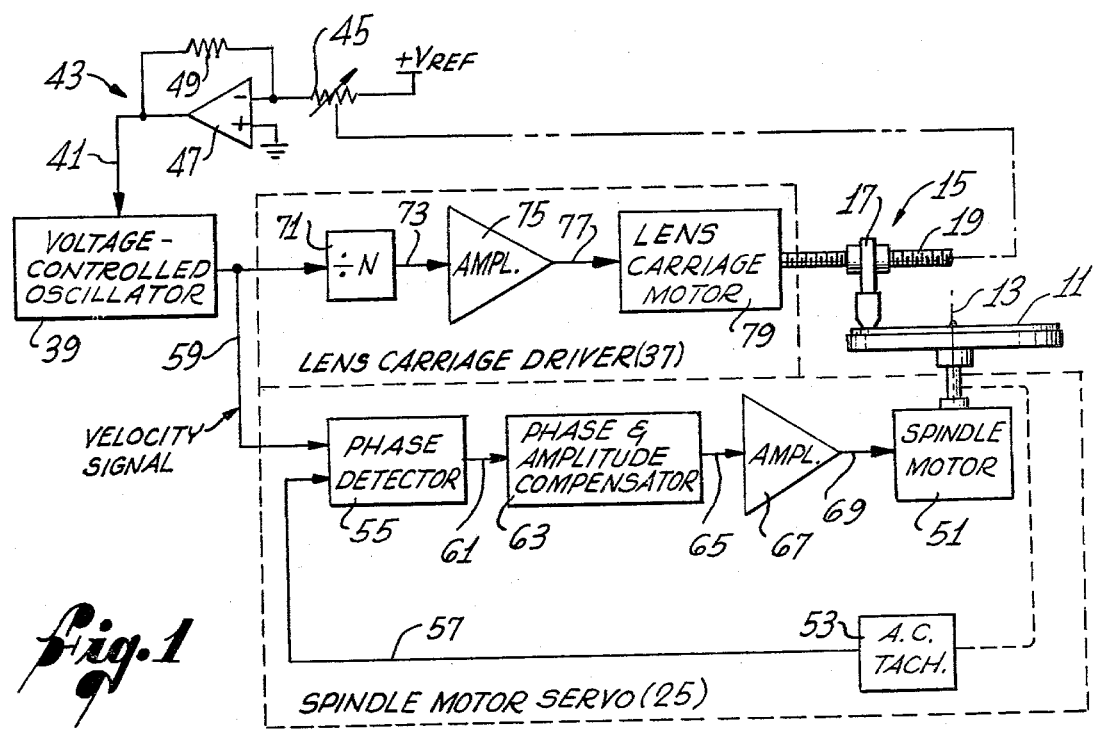
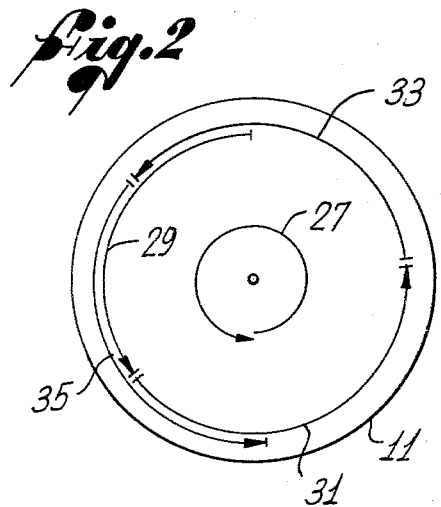
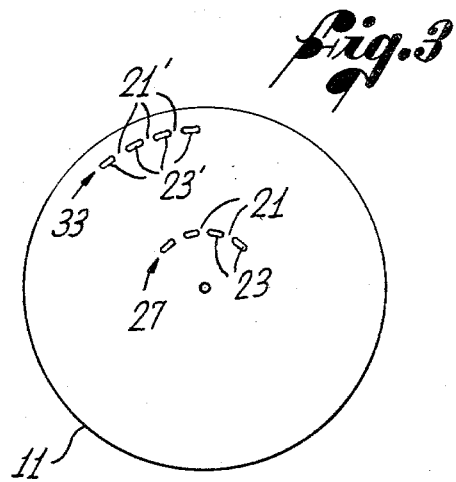

SYSTEM FOR RECORDING INFORMATION ON A ROTATABLE STORAGE DISC, IN A SUBSTANTIALLY UNIFORM RECORDING DENSITY

BACKGROUND OF THE INVENTION

This invention relates generally to information storage discs and, more particularly, to apparatus for rotating an information disc relative to a radially movable transducer.

Discs for storing large quantities of video information have come into increasing usage in recent years as a result of an increasing need for storage media that provide instantaneous playback, fast random access, and relatively high recording density. The information is typically encoded on the disc in the form of an optically readable sequence of light-reflective and light-scattering regions arranged in substantially circular tracks forming a spiral or concentric circular pattern over the information-bearing surface of the disc.

Ordinarily, the light-reflective and light-scattering regions are initially formed in the disc using an optical transducer for directing onto the disc a collimated beam of high intensity light that is modulated by the information to be recorded. The disc is rotated about its central axis at a substantially constant angular velocity relative to the transducer, while the beam of light is moved radially with respect to the disc at a relatively slow, but constant, velocity. Each revolution of the disc thus results in the production of a seprate, substantially circular information track. When recording video signals, the disc is ordinarily rotated at approximately 1800 r.p.m., whereby each information track contains the information for one video frame.

A typical system for rotating a disc at a constant angular velocity includes an oscillator for producing a reference signal having a prescribed constant frequency, and a servo for locking the angular velocity of the disc onto the frequency of the reference signal. The servo typically includes a spindle motor for rotating the disc, an AC tachometer coupled to the motor for producing a signal having a frequency indicative of the angular velocity of the motor and phase detector for comparing the tachometer signal with the reference signal and producing a control signal proportional to the difference in their respective phase angles. This control signal is suitably processed in a compensation circuit for producing a prescribed frequency response for the servo, and, in turn, amplified and coupled to the spindle motor to appropriately control its angular velocity.

Systems for encoding the discs at a constant angular velocity have not utilized all of the information storing capability of the discs, however, because the successive light-reflective and light-scattering regions forming information tracks near the periphery of disc are significantly larger in size than the corresponding regions forming tracks near the center of the disc. As a result, the density of the recorded information is substantially less at the periphery of the disc than near the center of the disc, and substantially less information can be stored than if the recording density were more uniform.

It will be appreciated from the foregoing that there is a need for a method and apparatus for rotating an information storage disc, relative to a radially movable transducer, at an angular velocity that decreases as the radial position of the transducer increases, whereby information can be recorded on the disc with a more uniform recording density and discs with a substantially longer playing time can be produced. The present invention fulfills this need.

SUMMARY OF THE INVENTION

Basically, the present invention is embodied in an improved apparatus, and a related method, for controlling the angular velocity of an information storage disc having a plurality of substantially circular and concentrically arranged information tracks. The disk is controllably rotated relative to a radially movable transducer positioned in a prescribed relationship relative to a selected one of the information tracks, whereby the transducer can either record or playback information from that track. In accordance with the invention, the apparatus includes means for reducing the angular velocity of the disc as the radius of the selected information track increases, whereby a greater density of information can be stored on the disc than if the angular velocity of the disc were maintained constant. In accordance with another aspect of the invention, the apparatus further includes means for correspondingly reducing the radial velocity of the transducer as the radius of the selected track increases, whereby the tracks are substantially equally spaced with respect to each other. Further, by making the angular velocity of the disc inversely proportional to the radius of the selected track, the track will be moved at a constant linear velocity relative to the transducer, and a uniformly high recording density over the entire surface of the disc can be achieved.

More particularly, an apparatus constructed in accordance with the present invention is especially adapted for use in an information storage disc mastering machine, wherein information is recorded onto the disc by an optical transducer. The transducer produces a collimated beam of light, which is modulated with the information to be recorded, and which is directed by a focusing lens onto a selected portion of the disc, as the disc is controllably rotated with respect to it. The lens is attached to a carriage that is radially movable relative to the disc by a lead screw, to direct the light beam onto the selected information track. The means for producing a measure of radius includes a potentiometer coupled to the movable lens carriage and appropriately connected to produce an analog voltage signal that varies inversely with the radius of the selected track. This analog voltage signal is applied to a voltage-controlled oscillator (VCO) to produce a velocity signal having a frequency substantially inversely proportional to the radius of the selected track.

The velocity signal produced by the VCO is applied to a spindle motor servo for synchronizing the angular velocity of a spindle motor that rotates the disc with instantaneous frequency of the velocity signal, whereby the disc is moved at a substantially constant linear velocity relative to the transducer. Additionally, the velocity signal is coupled to a lens carriage driver for controllably rotating the lead screw, and thereby moving the focusing lens in a radial direction, at a corresponding velocity proportional to the frequency of the velocity signal. Thus a uniformly high recording density for all of the information tracks on the disc is achieved.

Other aspects and advantages of the present invention will become apparent from the following description of the preferred embodiment, taken in conjunction with the accompanying drawings, which disclose, by way of example, the principles of the invention.

BRIEF DESCRIPTION OF THE DRAWINGS

FIG. 1 is a simplified block diagram of apparatus in accordance with the present invention, for recording information in a plurality of substantially circular and concentrically arranged tracks on an information storage disc, at a substantially uniform recording density for the entire disc;

FIG. 2 is a plan view of a video disc produced by the apparatus of FIG. 1, showing, in schematic form, a plurality of frames of a video signal recorded on the disc, each of the frames having substantially the same length; and FIG. 3, is a plan view of the video disc of FIG. 2, showing, in enlarged form, the successive light-reflective and light-scattering regions for two information tracks, one located near the periphery of the disc and the other near the center of the disc.

DESCRIPTION OF THE PREFERRED EMBODIMENT

Referring now to the drawings, and particularly to FIG. 1, there is shown a servo apparatus for rotating an information storage disc 11 about its central axis 13 at a precisely controlled angular velocity. The disc 11 is rotated relative to an optical transducer 15, which operates to record onto the disc information such as a conventional color television signal frequency modulated on a carrier.

The optical transducer 15 includes means for producing a collimated beam of light (not shown) modulated by the information to be recorded, along with a lens carriage 17, which is controllably movable by a lead screw 19, in a radial direction relative to the disc 11, to direct the light beam onto a selected portion of the disc as the disc is rotated with respect to it. This produces a series of substantially circular information tracks (see FIG. 2) forming a spiral on the surface of the disc, each track comprising an alternating sequence of light-reflective regions 21 and light-scattering regions 23 (FIG. 3).

Referring again to FIG. 1, the servo apparatus is shown to include means for producing a velocity signal having a frequency corresponding to the desired angular velocity of the information storage disc 11, along with a spindle motor servo 25, responsive to the velocity signal, for controllably rotating the disc at a corresponding angular velocity. In accordance with the invention, the velocity signal has an instantaneous frequency substantially inversely proportional to the radius of the information track being recorded, whereby the track is moved at a substantially constant linear velocity relative to the lens carriage 17 and a uniform information recording density over the entire surface of the disc is achieved.

The apparatus of FIG. 1 further includes a lens carriage driver 37, responsive to the velocity signal, for moving the lens carriage 17 radially relative to the disc 11 at a velocity corresponding to the frequency of the signal. Thus, the radial velocity of the lens carriage corresponds to the angular velocity of the disc, and resultant information tracks will be substantially equally spaced with respect to each other.

Since the information track being recorded is always moved at a constant linear velocity relative to the lens carriage 17, each video frame of a video signal being recorded will occupy an equal-length portion of an information track (or tracks) on the disc 11. FIG. 2 shows, in schematic form, one frame 27 of the video signal, extending over one complete information track near the center of the disc 11, along with a plurality of consecutive video signal frames 29, 31, 33, and 35 extending over a pair of tracks located near the periphery of the disc, each of these latter frames extending over substantially less than a complete circumference of the disc.

FIG. 3 shows, in enlarged form, the successive light-reflective and light-scattering regions 21 and 23 for a portion of the video signal frame designated 27, along with corresponding regions 21' and 23' for a portion of the frame designated 33. It should be noted that, since each video signal frame recorded on the disc 11 is substantially of equal length, the nominal lengths of the respective light-scattering regions 23 and 23' are, likewise, substantially equal. Thus, a maximum information recording density over the entire surface of the disc 11 can be maintained, and the disc can be used to store a substantially longer-playing video signal than was possible with conventional constant angular velocity discs.

Referring again to FIG. 1, the velocity signal, which has a frequency inversely proportional to the radius of the information track being recorded, is produced by a voltage-controlled oscillator (VCO) 39 that is controlled by a control signal received over line 41 from an amplifier circuit 43. This amplifier circuit is appropriately coupled to the lead screw 19, such that as the lens carriage 17 is moved radially, the voltage of the control signal will automatically vary substantially inversely with the radius of the information track being recorded. Further, the VCO 39 generates a frequency substantially directly proportional to the voltage of the control signal input, so the frequency of the velocity signal produced by the VCO will likewise vary substantially inversely with the radius of the track being recorded.

The amplifier 43 includes a conventional operational amplifier 47, with a fixed resistor 49 coupled between its output and negative input terminals, and with a potentiometer 45 coupled between its negative input terminal and a fixed voltage reference $+V_{REF}$. The potentiometer is mechanically coupled to the lead screw 19 that moves the lens carriage 17 and is adapted to produce an electrical current that varies inversely with the radius of the lens carriage, whereby the control signal produced by the amplifier 43 has a voltage likewise inversely proportional to the radius.

The spindle motor servo 25 operates in a conventional manner to synchronize the angular velocity of the disc 11 with the varying frequency of the velocity signal, whereby the disc is moved at a substantially constant linear velocity relative to the lens carriage 17. The servo includes a spindle motor 51 for rotating the disc 11 about its central axis 13, and an AC tachometer 53 mechanically coupled to the spindle motor for producing a tachometer signal having a frequency proportional to its angular velocity. The servo further includes a phase detector 55 for comparing the respective phase angles of the tachometer signal, supplied over line 57 from the tachometer, and the velocity signal, supplied on line 59 from the VCO 39, thereby producing a control signal proportional to the phase difference. This control signal is transmitted over line 61 to a conventional phase and amplitude compensator 63, and, in turn, over line 65 to an amplifier 67. The output of the amplifier is coupled over line 69 to the spindle motor 51 to appropriately control its angular velocity.

The lens carriage driver 37 operates in a conventional manner to drive the lens carriage 17 in a radial direction relative to the disc 11, at a velocity that corresponds to the frequency of the velocity signal. The driver 37 includes a divide-by-N circuit 71 for frequency dividing the velocity signal, supplied on line 59 from the VCO 39, to produce a carriage velocity control signal having a proportionately lower frequency. This carriage velocity control signal is transmitted over line 73 to an amplifier 75, and, in turn, over line 77 to a synchronous lens carriage motor 79 for appropriately rotating the lead screw 15 to controllably move the lens carriage in a radial direction relative to the information disc 11. Thus, the radial velocity of the lens carriage is made to be inversely proportional to the radius of the information track being recorded, and the successive tracks will be substantially equally spaced with respect to each other.

An improved embodiment of the present invention was developed subsequent to the making of the invention, and is disclosed in a commonly assigned application for U.S. Patent, Ser. No. 961,362, filed simultaneously herewith under the name John S. Winslow et al and entitled "Method and Apparatus for Rotating an Information Storage Disc".

From the foregoing description, it should be apparent that the present invention provides an effective apparatus for recording information on an information storage disc, wherein the information is stored in a series of substantially circular and concentrically arranged information tracks, at a substantially constant recording density. The information storage disc is rotated at an angular velocity substantially inversely proportional to the radius of the particular information track being recorded, whereby an approximately constant linear velocity of the disc relative to an optical transducer is maintained, and, additionally, the transducer is moved radially relative to the disc at a corresponding radial velocity substantially inversely proportional to the radius of the selected track, whereby the successive tracks are approximately equally spaced with respect to each other. Thus, the apparatus operates to record a substantially greater amount of information on the disc than does a conventional constant angular velocity apparatus, and when used to record video information, discs having a substantially longer playing time will be produced.

Although the invention has been described in detail with reference to its originally preferred embodiment, it will be understood by one of ordinary skill in the art that various modifications can be made without departing from the spirit and scope of the invention. Accordingly, it is not intended that the invention be limited, except as by the appended claims.

We claim:

1. Apparatus for recording information on a rotatable information storage disc, wherein the information is recorded in plurality of substantially circular and concentrically arranged information tracks, said apparatus comprising:
   transducer means movable radially relative to the disc to be positioned in a prescribed relationship relative to a selected one of the information tracks;
   velocity signal means for producing a velocity signal having an instantaneous frequency substantially inversely proportional to the radius of the selected track, said velocity signal means including
   means for producing a voltage signal substantially inversely proportional to the radius of the selected information track, said means including a potentiometer coupled to said radially movable transducer means, and
   oscillator means, responsive to said voltage signal, for producing the velocity signal;
   servo means for rotating the disc at an angular velocity synchronized with the instantaneous frequency of the velocity signal, said servo means including motor means for rotating the disc;
   tachometer means coupled to said motor means for producing a tachometer signal having a frequency proportional to the angular velocity of said motor means, and
   phase detector means for comparing the respective phase angles of the tachometer signal and the velocity signal, and for producing a control signal indicative of the phase difference thereof, said control signal being coupled to said motor means to appropriately control its angular velocity, whereby the selected information track is moved at a substantially constant linear velocity relative to said transducer means and a substantially uniform information recording density is achieved; and
   means, responsive to the velocity signal, for moving said transducer means radially relative to the disc at a corresponding radial velocity, whereby information is recorded on the plurality of information tracks in a sequential fashion and the tracks are substantially evenly spaced with respect to each other.

2. Apparatus for recording information on an information storage disc, wherein the information is recorded in plurality of substantially circular and concentrically arranged information tracks, said apparatus comprising:
   transducer means movable radially relative to the disc to be positioned in a prescribed relationship relative to a selected one of the information tracks;
   means for producing a velocity signal having a frequency substantially inversely proportional to the radius of the selected track;
   motor means for rotating the disc;
   tachometer means coupled to said motor means for producing a tachometer signal having a frequency proportional to the angular velocity of said motor means; and
   phase detector means for comparing the respective phase angles of the tachometer signal and the velocity signal, and for producing a control signal indicative of the phase difference thereof, said control signal being coupled to said motor means to appropriately control its angular velocity, whereby the selected information track is moved at a substantially constant linear velocity relative to said transducer means and a substantially uniform information recording density is achieved.

3. Apparatus for rotating an information storage disc relative to a transducer, wherein said disc has a plurality of substantially circular and concentrically arranged information tracks, and wherein said transducer is radially movable relative to said disc to be positioned in a prescribed relationship relative to a selected one of the information tracks, said apparatus comprising:

means coupled to the radially movable transducer for producing a voltage signal indicative of the radius of the selected information track;

oscillator means, responsive to said voltage signal, for producing a velocity signal having an instantaneous frequency substantially inversely proportional to the radius of the selected information track; and means for rotating the disc at a prescribed angular velocity synchronized with the instantaneous frequency of the velocity signal, whereby the selected information track is moved at a prescribed, constant linear velocity relative to the transducer.

4. Apparatus as defined in claim 3, wherein said means for rotating includes:

motor means for rotating the disc;

tachometer means coupled to said motor means for producing a tachometer signal having a frequency proportional to the angular velocity of said motor means; and phase detector means for comparing the respective phase angles of the tachometer signal and the velocity signal, and for producing a control signal indicative of the phase difference thereof, said control being coupled to said motor means to appropriately control its angular velocity.

5. Apparatus for rotating an information storage disc relative to a transducer, wherein said disc has a plurality of substantially circular and concentrically arranged information tracks, and wherein said transducer is radially movable relative to said disc to be positioned in a prescribed relationship relative to a selected one of the information tracks, said apparatus comprising:

oscillator means, coupled to the radially movable transducer, for producing a velocity signal having an instantaneous frequency substantially inversely proportional to the radius of the selected information track;

motor means for rotating the disc;

tachometer means coupled to said motor means for producing a tachometer signal having a frequency proportional to the angular velocity of said motor means; and phase detector means for comparing the respective phase angles of the tachometer signal and the velocity signal, and for producing a control signal indicative of the phase difference thereof, said control signal being coupled to said motor means to controllably adjust its angular velocity such that the respective phase angles are synchronized and the selected information track is moved at a prescribed constant linear velocity relative to the transducer.

6. A method of rotating an information storage disc relative to a transducer, wherein said disc has a plurality of substantially circular and concentrically arranged information tracks, and wherein said transducer is radially movable relative to said disc to be positioned in a prescribed relationship relative to a selected one of the information tracks, said method comprising the steps of:

coupling a potentiometer to the radially movable transducer, to produce a voltage signal indicative of the radius of the selected information track;

producing a velocity signal in accordance with the voltage signal, said velocity signal having a frequency substantially inversely proportional to the radius of the selected information track; and rotating the disc at an angular velocity synchronized with the frequency of the velocity signal, whereby the selected information track is moved at a prescribed, constant linear velocity relative to the transducer.

7. A method as defined in claim 6, wherein: the disc is rotated by motor means; and said step of rotating includes the steps of producing a tachometer signal having a frequency proportional to the angular velocity of the motor means; and comparing the respective phase angles of the tachometer signal and the velocity signal, to produce a control signal for coupling to the motor means to appropriately control its angular velocity.

8. A method of driving a motor to controllably rotate an information storage disc relative to a transducer, wherein said disc has a plurality of substantially circular and concentrically arranged information tracks, and wherein said transducer is radially movable relative to said disc to be positioned in a prescribed relationship relative to a selected one of the information tracks, said method comprising the steps of:

producing a velocity signal in accordance with the radial position of the transducer, said velocity signal having a frequency substantially inversely proportional to the radius of the selected information track;

producing a tachometer signal having a frequency proportional to the angular velocity of the motor; and comparing the respective phase angles of the tachometer signal and the velocity signal, to produce a control signal for coupling to the motor, to controllably adjust its angular velocity and thereby to synchronize the respective phase angles, whereby the selected information track is moved at a prescribed constant linear velocity relative to the transducer.

* * * * *